No. 767,697.  
PATENTED AUG. 16, 1904.  
O. G. KELLY.  
MEASURING VESSEL.  
APPLICATION FILED NOV. 12, 1902.  
NO MODEL.

WITNESSES:  
Thos. C. Morgan  
A. L. Phelps

INVENTOR.  
Orville G. Kelly  
BY  
C. O. Shepherd  
ATTORNEY.

No. 767,697.

Patented August 16, 1904.

UNITED STATES PATENT OFFICE.

ORVILLE G. KELLY, OF EATON, OHIO, ASSIGNOR OF ONE-HALF TO L. E. JENNINGS, OF EATON, OHIO.

MEASURING VESSEL.

SPECIFICATION forming part of Letters Patent No. 767,697, dated August 16, 1904.

Application filed November 12, 1902. Serial No. 130,940. (No model.)

*To all whom it may concern:*

Be it known that I, ORVILLE G. KELLY, a citizen of the United States, residing at Eaton, in the county of Preble and State of Ohio, have invented a certain new and useful Improvement in Measuring Vessels, of which the following is a specification.

My invention relates to the improvement of measuring vessels of that class which are particularly adapted for household use; and the objects of my invention are to provide an improved measuring vessel of this class of superior construction; to provide improved means for determining the quantity of material, whether liquid or dry, contained in the vessel, and to produce other improvements in details of construction which will be more fully pointed out hereinafter. These objects I accomplish in the manner illustrated in the accompanying drawings, in which—

Figure 1:
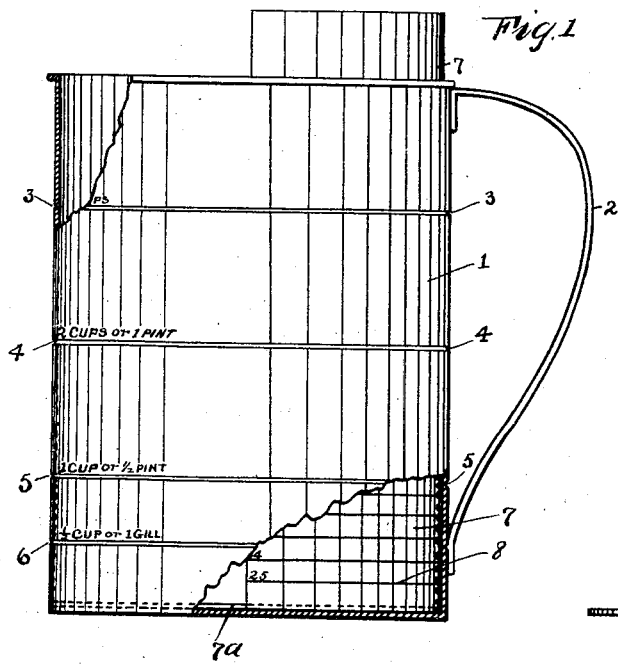
Figure 2:
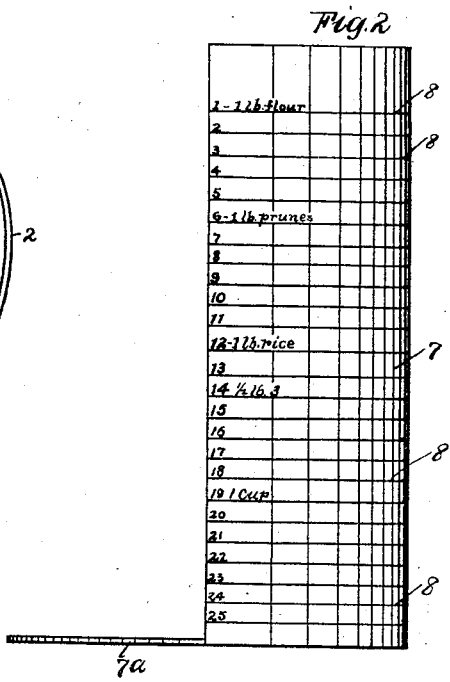
Figure 3:
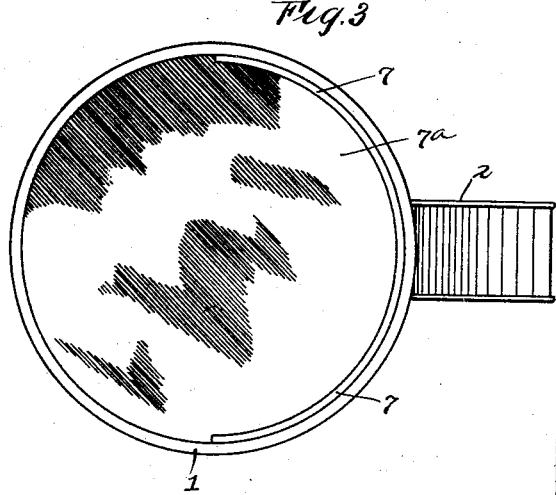
Figure 4:
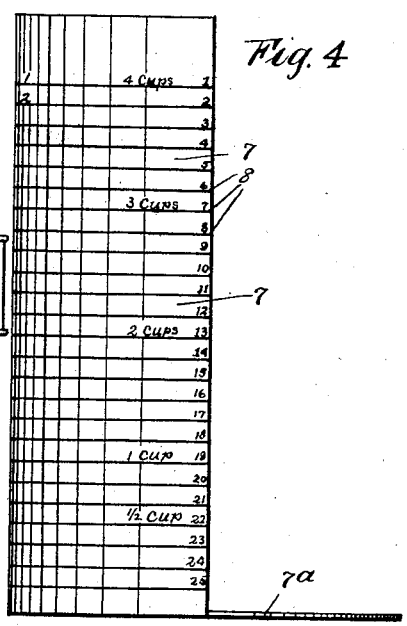

Figure 1 is a side elevation of my improved measuring vessel, showing portions of the same broken away for the sake of clearness in illustration. Fig. 2 is a side elevation of the detachable gage-body which is adapted to be inserted within said vessel and utilized in the manner hereinafter described. Fig. 3 is a plan view of the vessel shown in Fig. 1; and Fig. 4 is a side elevation of said gage-body, showing the opposite side from that disclosed in Fig. 2.

Similar numerals refer to similar parts throughout the several views.

In carrying out my invention I employ a cup-body 1, which may be in the nature of an ordinary measuring-cup of suitable capacity, said cup or vessel being provided with a desirable form of handle, as indicated at 2. In the construction of the cup I provide the same at proper intervals with continuous peripheral grooves or markings, such as are indicated at 3, 4, 5, and 6, and on each of the lines or marks thus formed is printed, stamped, or otherwise made to appear figures and words representing quantities in liquid measure, such as one-half cup or one gill or one cup or one-half pint.

7 represents a movable gage which, as indicated in the drawings, is in the nature of a half-cylindrical body the bottom of which is extended to form a complete disk, such as is indicated at 7ª, this bottom disk or follower being adapted to fit within the bottom of the cup or vessel 1 when said gage-body is inserted therein in the manner shown in the drawings. In other words, this gage comprises a follower 7ª, conforming closely to the internal contour of the vessel and working freely therein and provided with an upstanding semiperipheral flange 7, which normally rises above the top of the vessel with its upper projected portion forming a hand-grasp for adjusting the gage. In forming the half-cylindrical body 7 of the gage I provide the same on the outer side with numbered parallel lines 8, arranged one above the other and extending transversely across the surface of the gage, the upper one of these lines being so located as to be brought opposite the upper end of the cup 1 when said gage is inserted therein. On these lines 8 or on the desired number of said lines are printed figures and words indicating amounts of various articles subject to measurement, such as flour, prunes, rice, &c. The printed words and figures which are thus arranged opposite the numbers of the lines 8 are at such height on said gage-body as to result when one of said lines is brought opposite the upper end or mouth of the vessel 1 in providing a vessel-space above the bottom 7ª of the gage, which is adapted to contain the amount indicated by the line thus brought to the top of the vessel. For example, it being desired to measure one pound of prunes the gage would be elevated within the cup or vessel 1 until the line 8, which is numbered "6," was even with the top of the vessel, the result being that when the space between said vessel-top and the bottom of the gage was filled with prunes one pound of the latter would be contained therein. The above-described line-markings are, as indicated in the drawings, preferably arranged near one of the vertical edges of said half-cylindrical gage-body, and near the opposite ends of said lines and adjacent to the remaining vertical edge of the gage are indicated amounts in dry measure, such as "4 cups," "3 cups," "2 cups," &c., these words and amounts marking lines at proper distances one from the other.

From the construction herein shown and described it will be seen that simple, reliable, and effective means are provided for determining various amounts of various articles or materials contained in a cup and that the same will be exceedingly useful as a kitchen utensil.

Having now fully described my invention, what I desire to secure by Letters Patent is—

A device of the character described comprising a vessel having a closed bottom constituting a support therefor, a follower conforming closely to the internal contour of the vessel working freely therein, and capable of resting upon the bottom of the vessel, and an upstanding semiperipheral flange carried by the follower and normally projected above the top of the vessel to form a hand-grasp for adjusting the follower, the exterior of the flange being provided with a vertical series of transverse indicator-lines for alinement with the top of the vessel to form an index for use in adjusting the follower.

ORVILLE G. KELLY.

In presence of—
C. A. HATHAWAY,
C. R. GILMORE.